April 25, 1967  J. TSCHUDY, JR  3,315,623
FILM LAYER AND PLANTER

Filed March 30, 1964  2 Sheets-Sheet 1

INVENTOR.
JAY TSCHUDY JR.
BY
Willard S. Ground
ATTORNEY

April 25, 1967   J. TSCHUDY, JR   3,315,623
FILM LAYER AND PLANTER
Filed March 30, 1964                2 Sheets-Sheet 2
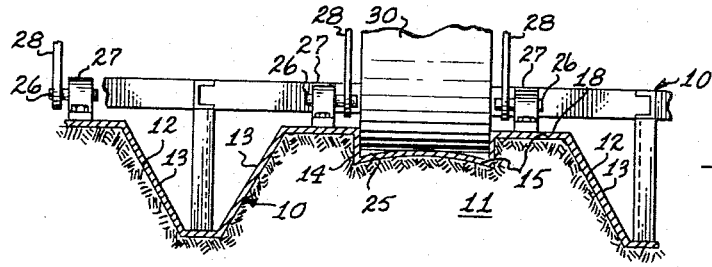
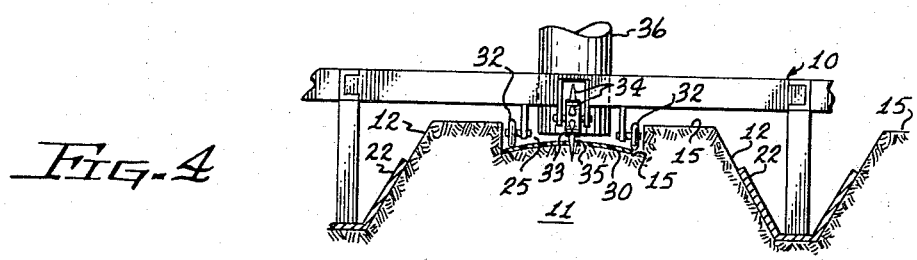
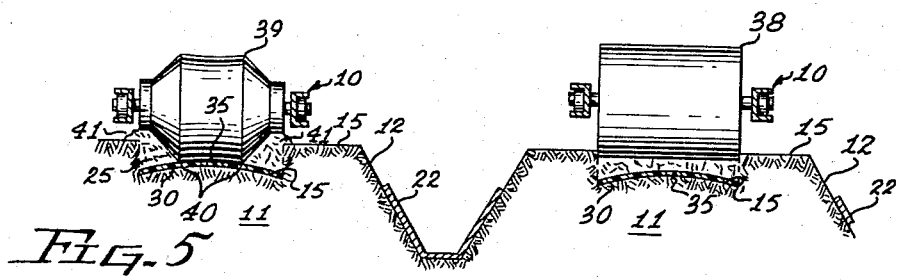
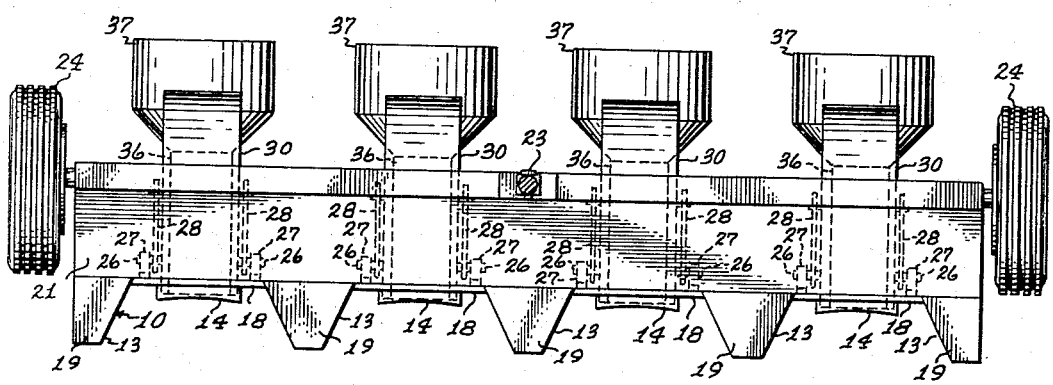
INVENTOR.
JAY TSCHUDY JR.
BY
Willard L. Grome
ATTORNEY United States Patent Office 3,315,623
Patented Apr. 25, 1967

3,315,623
FILM LAYER AND PLANTER
Jay Tschudy, Jr., 7000 Belinder Road,
Shawnee Mission, Kans.
Filed Mar. 30, 1964, Ser. No. 355,684
2 Claims. (Cl. 111—1)

This invention pertains to improvements in agricultural machinery and is particularly directed to a plastic mulch film laying and seed planting machine.

One of the objects of this invention is to utilize a slip form technique in the preparation of the seed bed and laying mulch sheet along a plant row of a field.

Another object is to provide a method of progressively mulching, slip forming, mulch sheet laying, and seeding a plant row in a rapid efficient manner.

Still another object is to provide a system of automatically laying a flat sheet covered with soil at a predetermined depth along a plant row in a field.

It is also an object to plant seed along a plant row under a soil covered plastic mulch sheet.

A further object is to provide an improved mulch sheet arrangement along a plant row to maintain more uniform and satisfactory temperature, moisture and frost control conditions for the safe and efficient germination of seeds in the plant row.

Further features and advantages of this invention will appear from a detailed description of the drawings in which:

FIG. 3 is an enlarged fragmentary sectional view on the line 3—3 of FIGS. 1 and 2.

FIG. 4 is an enlarged fragmentary sectional view on the line 4—4 of FIGS. 1 and 2.

FIG. 5 is an enlarged fragmentary sectional view on the line 5—5 of FIGS. 1 and 2.

FIG. 6 is a front elevation of the apparatus shown in FIG. 1.

Figure 1:
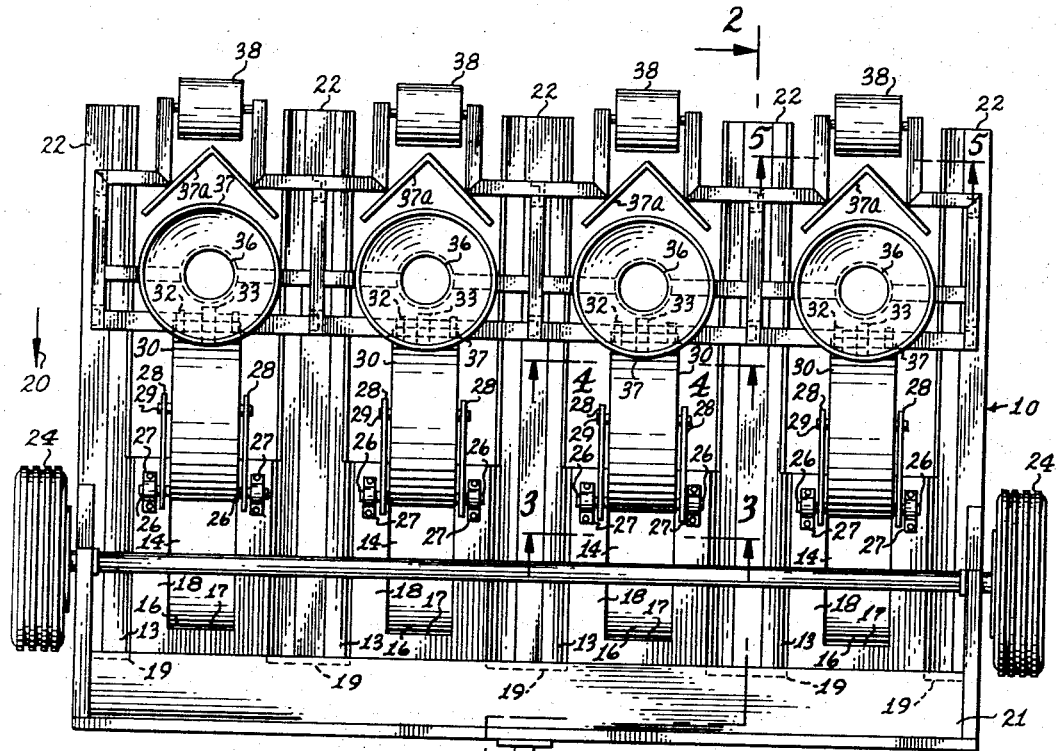
FIG. 1 is a plan view of a film layer and planter apparatus incorporating the features of this invention.
Figure 2:
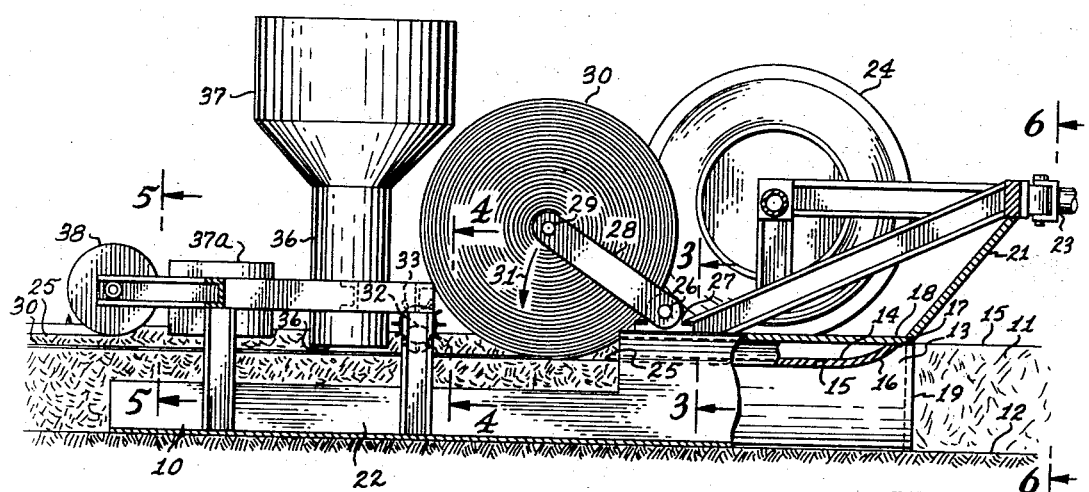
FIG. 2 is an enlarged sectional view, partly broken away, of the apparatus indicated by the line 2—2 of FIG. 1.

As an example of one embodiment of this invention, there is shown a film layer and planter machine comprising a slip form apparatus having a sled 10 for shaping plant rows 11 and furrows 12. Depressed trough portions 13 of the sled 10 form the furrows 12 while the horizontal form portions 14 and 18 form the horizontal top surfaces 15 and bed shape grooves 25 of the plant rows 11.

The forward portions 16 of the horizontal form portions 14 slope upwardly and forwardly terminating at the forward edge 17 of the deck 18. The forward ends of the trough portions 13 are closed by appropriate plates 19 which diverts the soil, as the unit moves forwardly in the direction of the arrow 20, into the row forming areas below horizontal form portions 14 and 18 of the sled 10. An upwardly forwardly extending deflecting moldboard 21 is fixed at its lower edge to the edge 17 of the deck 18 to confine the soil to the forward portion of the unit and to divert the soil into the row forming areas below the horizontal form portions 14 of the sled 10.

Integral rearward extensions 22 are provided for trough portions 13 of the sled to maintain stability and alignment of the device as it moves along the plant rows. Preferably the unit is connected by a suitable hitch 23 to a towing tractor. The soil in front of the sled is either cultivated and mulched prior to the passage of the sled over the ground surface or a suitable mulching machine may be placed in front of the sled to prepare the soil for proper working by the sled unit as it is towed along behind the mulching apparatus. Suitable gauge wheels 24 are appropriately connected to the sled to regulate the depth at which the sled operates relative to the initial ground surface of the field.

Pivotally mounted on a suitable rock shaft 26 carried by suitable bearings 27 mounted on the deck 18 are the arms 28 which carry at their outer ends a suitable roll shaft 29 upon which is rotatably mounted a roll of polyethylene or the like material 30 and which normally swings downwardly as indicated by the arrow 31 to roll in contact with the bed shape groove 25, unrolling the sheet on the slightly convex surface thereof as the unit moves along the plant rows. Immediately following the roll 30 are a pair of laterally spaced film press wheels 32 suitably journaled on the sled 10 and adapted to press down the edges of the plastic film sheet 30. At the same time a suitable film puncturing wheel 33 having perforating spikes 34 forms longitudinally spaced seed openings 35 through which seed is planted by a suitable planter mechanism 36 supplied from a seed hopper 37 carried on the sled 10.

Immediately following the planting of the seed through the plastic film 30, backfiller blades 37$_a$ carried on the sled 10 to scrape soil from the sides of the plant row 11 over the plastic sheet 30 after which a compression roller 38 suitably carried on the sled 10 compacts the soil over the top of the previously placed plastic sheet 30 to complete the plant row for normal plant growth with the sheet 30 completely covered with soil so that no part thereof is exposed to atmosphere. In this arrangement the top 11 of the plant row is a horizontal flat soil surface from which the plants germinate and grow.

Instead of the cylindrical roller 38 just described, a roller 39 modified as shown in FIG. 5 may be utilized wherein the finally prepared plant row is formed with an exposed middle portion 40 having berms of soil 41 extending along each side of the plastic sheet 30 so that the perforated seed planted sheet lies in a trough to receive rain or irrigation water which may enter the seed perforations 35 and seep through the berms 41 to water the plants and thereby facilitate efficient long row irrigation of the plant rows. Further, the placement of the plastic sheet as described controls evaporation and frost damage to early seedlings and greatly reduces night radiation of heat from the plant row thus allowing earlier planting of seeds while speeding up and protecting the germination process, particularly in marginal frost prone areas.

While the apparatus herein disclosed and described constitutes a preferred form of the invention, it is also to be understood that the apparatus is capable of mechanical alteration without departing from the spirit of the invention and that such mechanical arrangement and commercial adaptation as fall within the scope of the appendent claims are intended to be included herein.

In the embodiment of the invention previously described, the plant seeds were planted through perforations provided in the polyethylene film. Under some circumstances, as for example when the film is thin, e.g., 1 mil thick or less, and certain seed such as cotton are planted, the germinating plants may have sufficient strength to force their way through the thin film. Under such circumstances, the seeds may be planted the conventional manner and the film simply laid thereover without providing any perforations therein.

Having thus fully set forth and described this invention, what is claimed and desired to be obtained by United States Letters Patent is:

1. The method of preparing a plant row comprising:
(a) forming a depressed shallow trough extending longitudinally of the plant row, (b) laying a thin sheet of moisture-impervious plastic film longitudinally on the bottom surface of said trough, (c) planting seeds in the bottom surface of said trough at longitudinally spaced intervals beneath said sheet, and (d) back filling said trough with soil so as to uniformly cover the entire plastic film with a thin layer of soil.

2. The method of preparing a plant row of cotton comprising: (a) forming a depressed shallow trough extending longitudinally of the plant row, (b) planting cotton seed longitudinally in said trough at the plant spacings desired, (c) laying a sheet of unperforated polyethylene film having a thickness of one mil or less longitudinally on the bottom surface of said trough, and (d) back filling said trough with soil so as to uniformly cover the entire polyethylene sheet with a thin layer of soil.

References Cited by the Examiner

UNITED STATES PATENTS

| | | | |
|---|---|---|---|
| 263,248 | 8/1882 | Thompson. | |
| 1,786,021 | 12/1930 | Mett et al. | 47—9 |
| 1,803,838 | 5/1931 | Carpenter. | |
| 2,029,343 | 2/1936 | Sperr | 47—9 |
| 2,030,267 | 2/1936 | Pratt | 47—9 |
| 2,749,855 | 6/1956 | Guigas | 111—3 |
| 2,890,665 | 6/1959 | Kang | 111—3 |
| 2,975,842 | 3/1961 | Mostrong | 172—252 |
| 3,149,588 | 9/1964 | Gatzke | 111—1 |
| 3,154,030 | 10/1964 | Williams | 111—1 |
| 3,204,589 | 9/1965 | Blackhurst et al. | 47—9 X |
| 3,234,691 | 2/1966 | Cowell | 47—9 |

ABRAHAM G. STONE, *Primary Examiner.*

WILLIAM A. SMITH III, *Examiner.*